(12) United States Patent
Burke

(10) Patent No.: US 11,047,431 B2
(45) Date of Patent: Jun. 29, 2021

(54) FOUR-MODE SWITCHABLE RATCHETING CLUTCH

(71) Applicant: Schaeffler Technologies AG & Co. KG, Herzogenaurach (DE)

(72) Inventor: Peter Burke, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 42 days.

(21) Appl. No.: 16/671,489

(22) Filed: Nov. 1, 2019

(65) Prior Publication Data

US 2021/0131506 A1   May 6, 2021

(51) Int. Cl.
| | |
|---|---|
| *F16D 41/04* | (2006.01) |
| *F16D 41/12* | (2006.01) |
| *F16D 45/00* | (2006.01) |
| *F16D 28/00* | (2006.01) |
| *F16D 43/202* | (2006.01) |

(52) U.S. Cl.
CPC ............. *F16D 41/04* (2013.01); *F16D 28/00* (2013.01); *F16D 41/12* (2013.01); *F16D 43/202* (2013.01); *F16D 45/00* (2013.01)

(58) Field of Classification Search
CPC .......... F16D 41/04; F16D 41/12; F16D 41/16; F16D 43/20; F16D 45/00; F16D 28/00
See application file for complete search history.

(56) References Cited

U.S. PATENT DOCUMENTS

| | | | |
|---|---|---|---|
| 2002/0017441 A1 | 2/2002 | Kemp | |
| 2009/0266667 A1* | 10/2009 | Sarnie | F16D 41/12 192/43.1 |
| 2010/0122883 A1 | 5/2010 | Bartos et al. | |
| 2017/0248177 A1* | 8/2017 | Martin | F16D 28/00 |
| 2018/0274604 A1 | 9/2018 | Ince | |
| 2019/0271365 A1 | 9/2019 | Coic et al. | |
| 2019/0345995 A1* | 11/2019 | Brezger | F16D 41/066 |
| 2020/0240479 A1* | 7/2020 | Liu | F16H 19/001 |

FOREIGN PATENT DOCUMENTS

WO        2019-022859 A1        1/2019

* cited by examiner

*Primary Examiner* — Charles A Fox
*Assistant Examiner* — Lori Wu

(57) ABSTRACT

A switchable clutch, including: a housing defining a pocket; a race arranged to receive torque; a pawl disposed in the pocket; a spring ring rotatable by an actuator to circumferential position with respect to the pawl; a ramp ring; and resilient element fixed to the spring ring and in contact with the pawl. In a free-wheel mode: the race is rotatable, with respect to the housing, in a first circumferential direction and in a second circumferential direction; and the resilient element urges the pawl radially outwardly out of contact with the race. In a one-way mode: the spring ring is in the circumferential position; the resilient element urges the pawl into contact with the race; and the pawl blocks rotation of the race, with respect to the housing, only in the first circumferential direction. In a locked mode, the ramp ring, the pawl, and the race are non-rotatably connected.

20 Claims, 14 Drawing Sheets

Fig. 2

FOUR-MODE SWITCHABLE RATCHETING CLUTCH

TECHNICAL FIELD

The present disclosure relates to a ratcheting clutch using same sets of pawls and resilient elements to switch among four operating modes.

BACKGROUND

Known ratcheting one-way clutches generally have a single engaging side, provide ratcheting (free-wheel) function in only one circumferential direction, and cannot provide full lock or full free-wheel functionality. Known one-way ratcheting clutches designed to provide ratcheting in two circumferential directions require separate ratcheting elements, for example different sets pawls and ancillary components, for each circumferential direction, increasing the size, weight, complexity, and cost of the clutch.

SUMMARY

According to aspects illustrated herein, there is provided a switchable clutch, including: a housing defining a pocket; a race arranged to receive rotational torque; a pawl including a portion disposed in the pocket; a spring ring located radially outward of the race and rotatable by a first actuator to a first circumferential position with respect to the pawl; a ramp ring located radially outward of the race; and a first resilient element fixedly connected to the spring ring and in contact with the pawl. In a free-wheel mode of the switchable clutch: the race is rotatable, with respect to the housing, in a first circumferential direction and in a second circumferential direction, opposite the first circumferential direction; and the first resilient element urges the pawl radially outwardly out of contact with the race. In a first one-way mode of the switchable clutch: the spring ring is in the first circumferential position with respect to the pawl; the first resilient element urges the pawl into contact with the race; and the pawl blocks rotation of the race, with respect to the housing, only in the first circumferential direction. In a locked mode of the switchable clutch, the ramp ring, the pawl, and the race are non-rotatably connected.

According to aspects illustrated herein, there is provided a switchable clutch, including: a housing; a race arranged to receive rotational torque and at least a portion of which is enclosed by the housing; a pawl; a spring ring located radially outward of the race; a ramp ring located radially outward of the race; and a first resilient element fixedly connected to the spring ring and in contact with the pawl. In a free-wheel mode of the switchable clutch: the race is rotatable, with respect to the housing, in a first circumferential direction and in a second circumferential direction, opposite the first circumferential direction; and the pawl is free of contact with the race. In a first one-way mode of the switchable clutch, the race is rotatable, with respect to the housing, only in the second circumferential direction. To transition from the free-wheel mode to the first one-way mode, the spring ring is arranged to be rotated, by a first actuator, in the first circumferential direction, and the first resilient element is arranged to displace the pawl into contact with the race. In a locked mode of the switchable clutch, the race is non-rotatably connected to the pawl. To transition to the locked mode from the free-wheel mode or from the first one-way mode: the ramp ring is arranged to be rotated, by the first actuator, in the first circumferential direction or in the second circumferential direction, and the ramp ring is arranged non-rotatably connect the pawl and the race; or the ramp ring is arranged to be rotated, by a second actuator, in the first circumferential direction or in the second circumferential direction, and the ramp ring is arranged non-rotatably connect the pawl and the race.

According to aspects illustrated herein, there is provided a method of operating a switchable clutch including a housing defining a pocket, a race, a pawl including a portion disposed in the pocket, a spring ring located radially outward of the race, a ramp ring located radially outward of the race, and a first resilient element fixedly connected to the spring ring, the method including: urging, with the first resilient element, the pawl radially outwardly and out of contact with the race for a free-wheel mode of the switchable clutch; enabling rotation of the race, with respect to the housing, in a first circumferential direction and in a second circumferential direction, opposite the first circumferential direction; rotating the spring ring, with a first actuator and with respect to the housing, in the first circumferential direction; tipping, with the first resilient element, a first distal end of the pawl into contact with the race; blocking, with the pawl and for a first one-way mode of the switchable clutch, rotation of the race, with respect to the housing, only in the first circumferential direction; rotating the spring ring, with the first actuator and with respect to the housing, in the second circumferential direction; tipping, with the first resilient element, a second distal end of the pawl into contact with the race; blocking, with the pawl and for a second one-way mode of the switchable clutch, rotation of the race, with respect to the housing, only in the second circumferential direction; and to transition to a locked mode of the switchable clutch from the free-wheel mode, the first one-way mode, or the second one-way mode: rotating, with respect to the housing and with the first actuator or with a second actuator, the ramp ring in the first circumferential direction or in the second circumferential direction, displacing, with the ramp ring, the pawl radially inwardly, and non-rotatably connecting the housing, the pawl, and the race.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 2 is a front view of the switchable ratcheting clutch shown in FIG. 1;

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
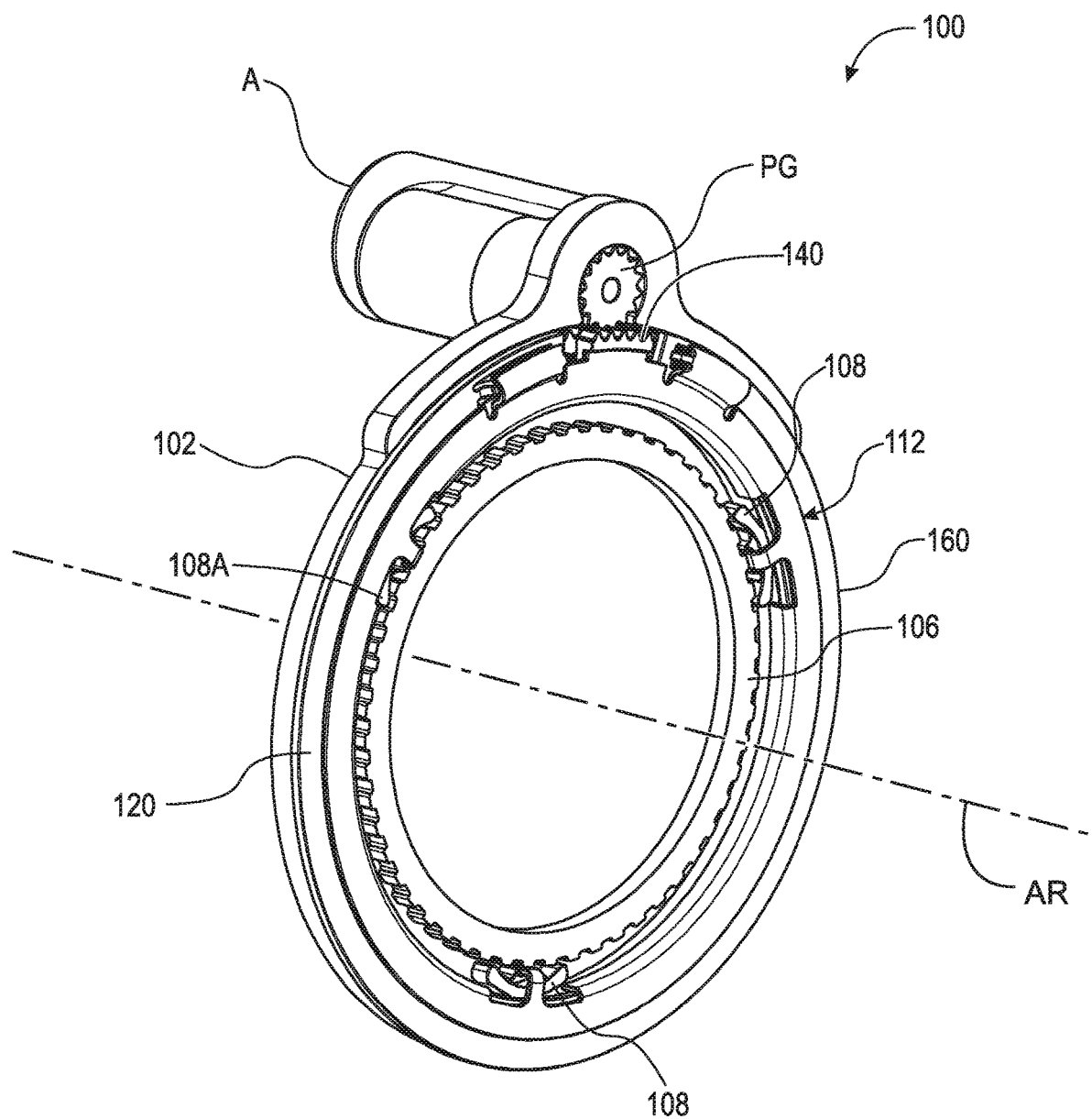
FIG. 1 is a front isometric view of a switchable ratcheting clutch in a free-wheel mode.

FIG. 1 is a front isometric view of switchable ratcheting clutch 100 in a free-wheel mode.

Figure 2:
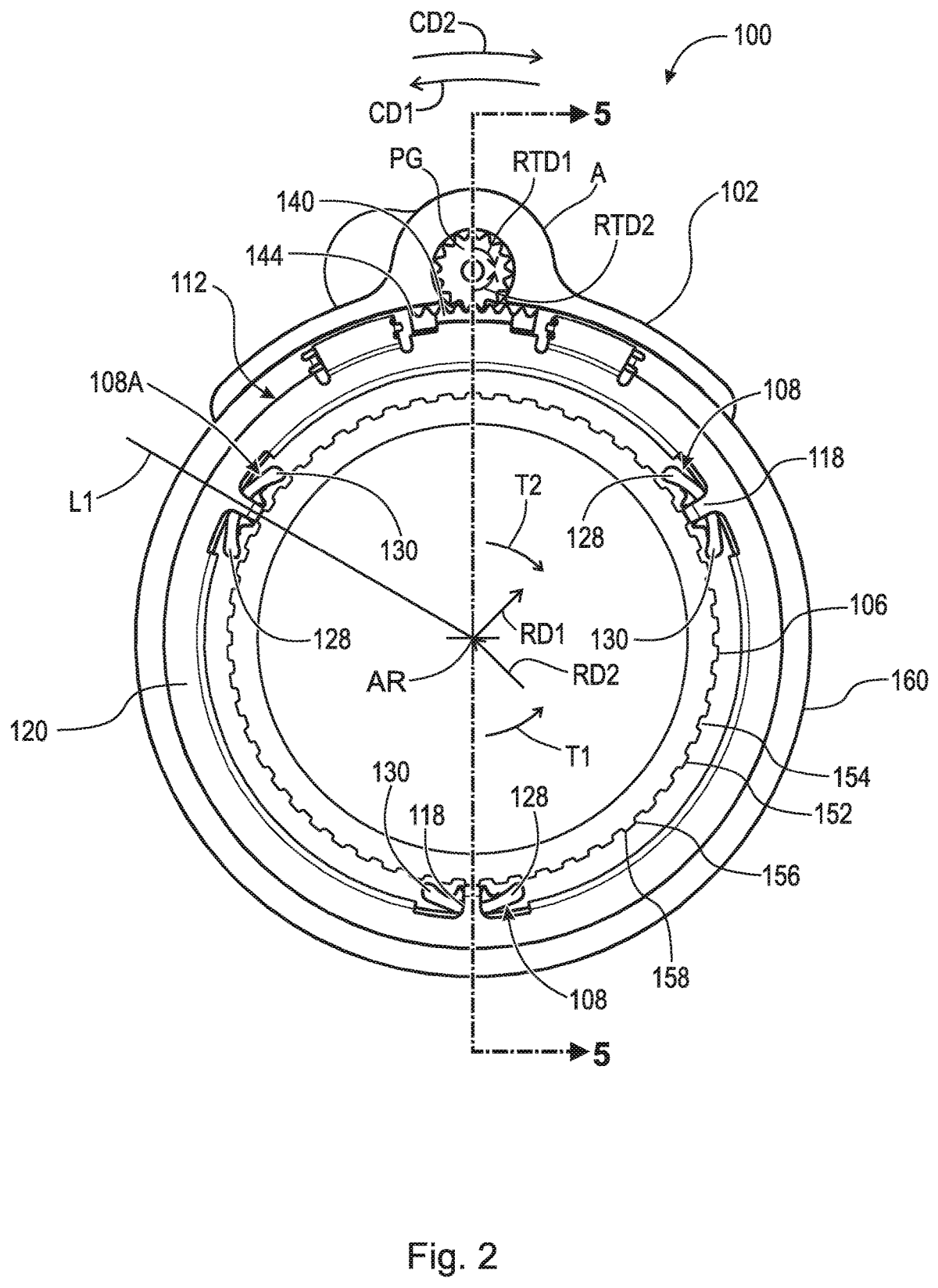

FIG. 2 is a front view of switchable ratcheting clutch 100 shown in FIG. 1.

Figure 3:
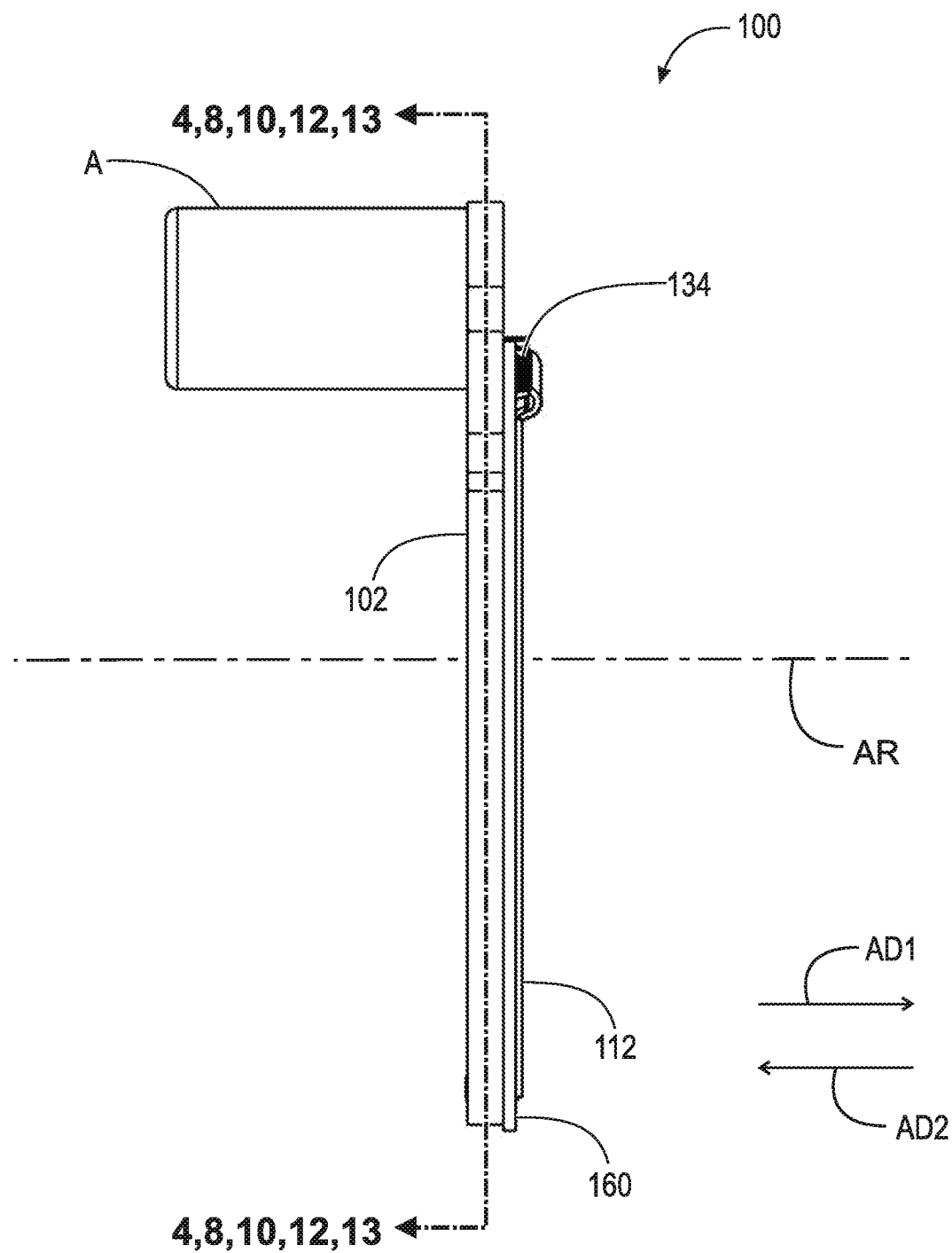
FIG. 3 is a side view of the switchable ratcheting clutch shown in FIG. 1 in an unspecified mode.

FIG. 3 is a side view of switchable ratcheting clutch 100 shown in FIG. 1 in an unspecified mode.

Figure 4:
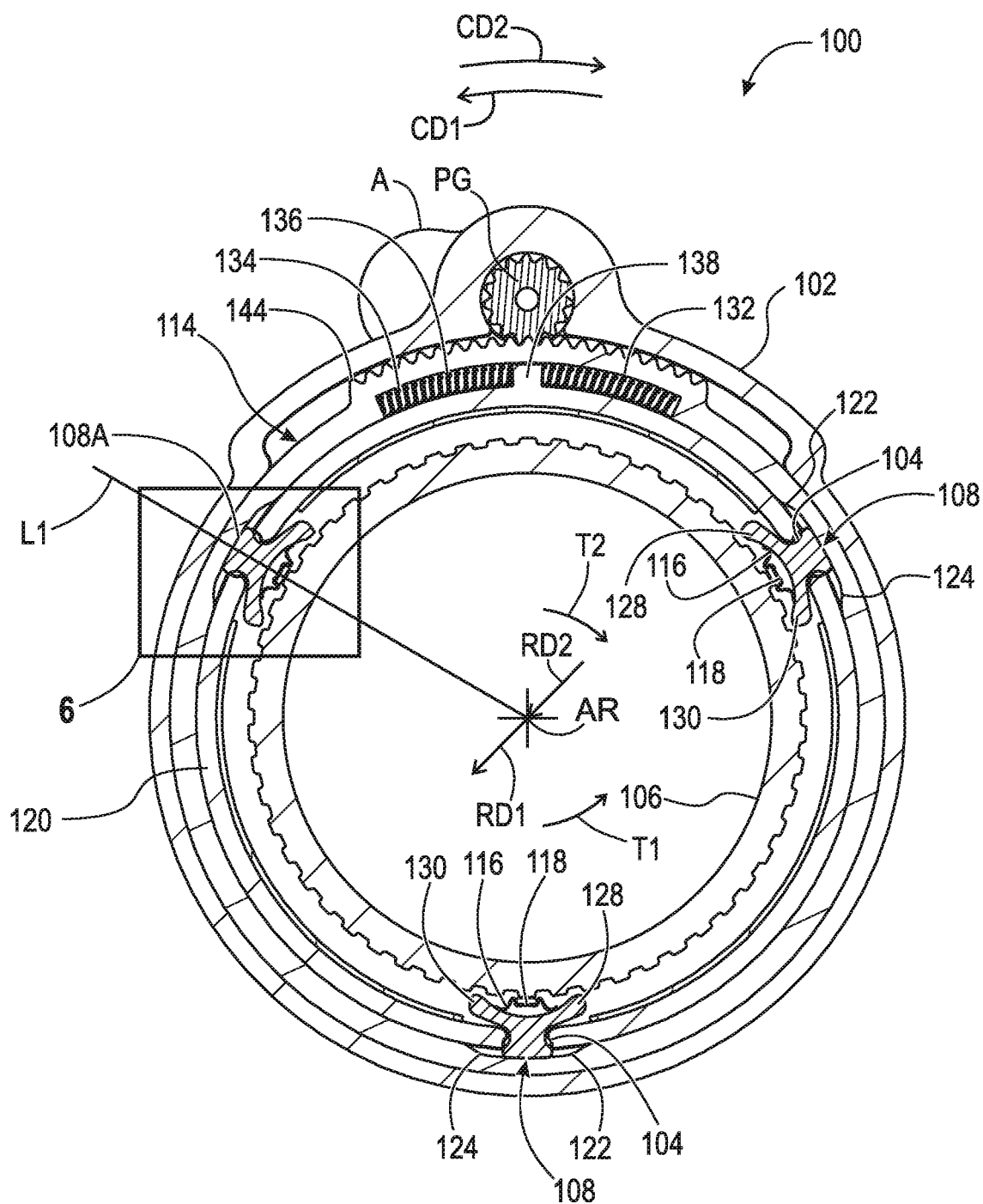
FIG. 4 is a cross-sectional view generally along line 4,8,10,12,13-4,8,10,12,13 in FIG. 3.

FIG. 4 is a cross-sectional view generally along line 4,8,10,12,13-4,8,10,12,13 in FIG. 3.

Figure 5:
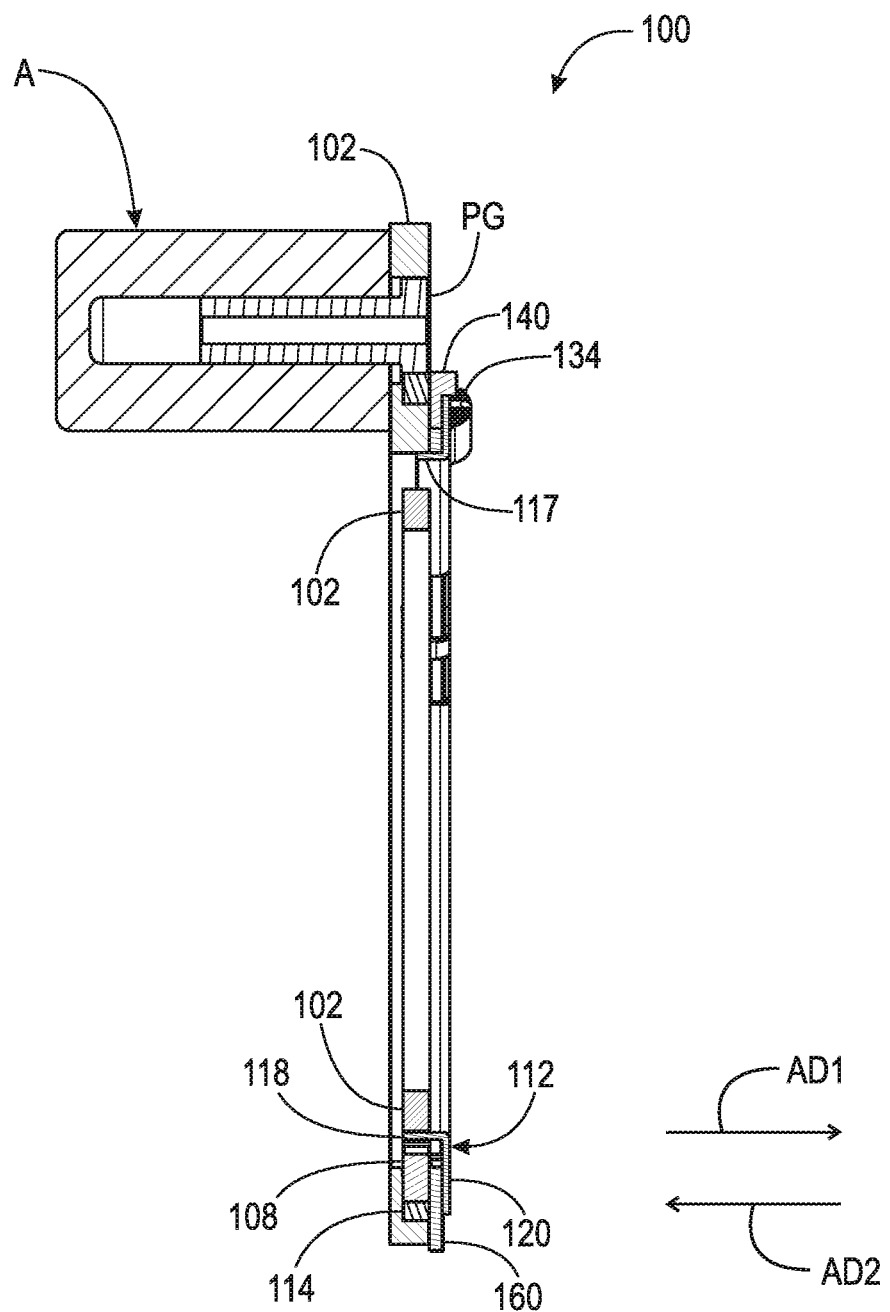
FIG. 5 is a cross-sectional view generally along line 5-5 in FIG. 2.

FIG. 5 is a cross-sectional view generally along line 5-5 in FIG. 2. The following should be viewed in light of FIGS. 1 through 5. Switchable clutch 100 includes: housing 102 forming pockets 104; and race 106. Race 106: is arranged to receive one or both of rotational torque T1 and T2 in circumferential direction CD1 and circumferential direction CD2, respectively; and is supported for rotation around axis of rotation AR. Circumferential directions CD1 and CD2 are with respect to a radius centered on axis AR and swept around axis AR. Line L1, described infra includes such a radius. Circumferential direction CD2 is opposite circumferential direction CD1. Clutch 100 includes pawls 108. Each pawl 108 includes: portion 110 disposed in a respective pocket 104; and portion 111 radially disposed between housing 102 and race 106. Clutch 100 includes: spring ring 112 located radially outward of race 106; ramp ring 114 located radially outward of race 106; and resilient elements 116 fixedly connected to ring 112. Each element 116 is in contact with a respective pawl 108.

In an example embodiment, an entirety of race 106 is enclosed by housing 102 in radially outer direction RD1, orthogonal to axis AR. In an example embodiment, portion 117 of ring 112 is enclosed by housing 102 in direction RD1. In an example embodiment, an entirety of ring 114 is enclosed by housing 102 in radially outer direction RD1.

Ring 112 is rotatable with respect to housing 102, pawls 108, and ring 114 by actuator A. For example, ring 112 is rotatable in directions CD1 and CD2 with respect to housing 102, pawls 108, and ring 114 by actuator A. Ring 114 is rotatable with respect to housing 102, pawls 108, and ring 112 by actuator A. For example, ring 114 is rotatable in directions CD1 and CD2 with respect to housing 102, pawls 108, and ring 112 by actuator A. In an example embodiment, ring 112 and ring 114 are off-set and overlap in axial direction AD1, parallel to axis AR. Pawls 108 overlap rings 112 and ring 114 in radially outer direction RD1. In an example embodiment, clutch 100 includes actuator A.

In a free-wheel mode of switchable clutch 100: resilient elements 116 urge at least portions, for example portions 111, of the respective pawls 108 radially outwardly, in radially outer direction RD1, and out of contact with race 106; and race 106 is rotatable, with respect to housing 102, in circumferential direction CD1 and in circumferential direction CD2. In an example embodiment, in the free-wheel mode of switchable clutch 100, resilient elements 116 urge respective entireties of the respective pawls 108 radially outwardly, in radially outer direction RD1, and out of contact with race 106. In the free-wheel mode of switchable clutch 100: ring 112 is in a first circumferential position with respect to housing 102 and pawls 108; and ring 114 is in a first circumferential position with respect to housing 102 and pawls 108.

By "circumferential position" of one component to another, we mean a position of the component defined by directions CD1 and CD2 with respect to the other component. Stationary straight line L, orthogonal to axis AR, is used as a benchmark for the circumferential positions of ring 112 and ring 114. By 'stationary" we mean that: a rotational position of line L, with respect to axis AR, is fixed; or a circumferential position of line L, with respect to housing 102, is fixed.

Figure 6:
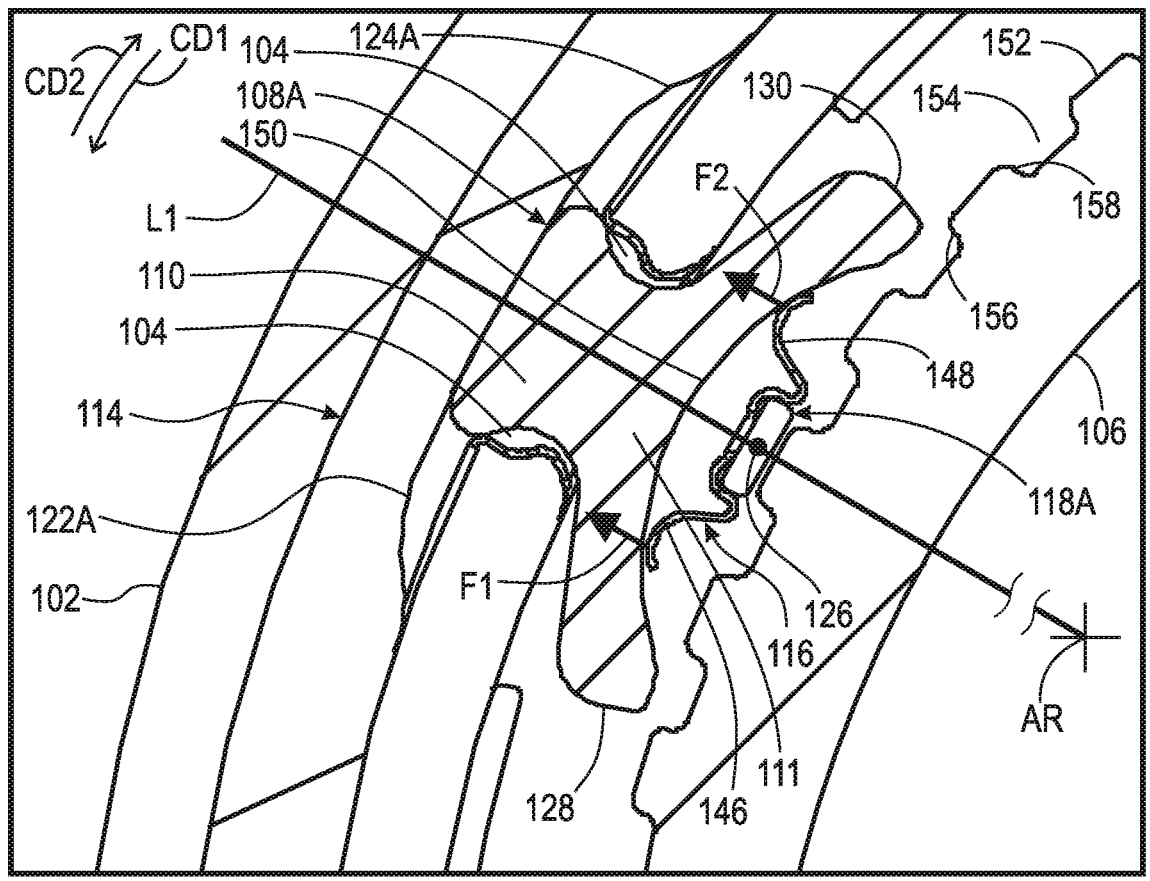
FIG. 6 is a detail of area 6 in FIG. 4.

FIG. 6 is a detail of area 6 in FIG. 4. The following should be viewed in light of FIGS. 1 through 6. In an example embodiment, ring 112 includes brackets 118, extending radially inwardly from annular portion 120 of ring 112 and in axial direction AD2 with respect to portion 120. In an example embodiment, annular portion 120 is unbroken, that is continuous, in directions CD1 and CD2. Each pawl 108: is partially enclosed by a respective bracket 118, or overlaps a respective bracket 118 in direction RD1.

In an example embodiment, ring 114 includes: ramps 122, sloping radially inwardly in direction CD1; and ramps 124 sloping radially inwardly in direction CD2. Ramps 122 and 124 are grouped in pairs. In the example of FIG. 1 in the free-wheel mode, line L: passes through circumferential center point 126 of bracket 118A to define the first circumferential position of ring 112; bisects pawl 108A in directions CD1 and CD2; and is circumferentially centered between ramps 122A and 124A to define the first circumferential position of ring 114. It is understood that the discussion for pawl 108A, bracket 118A, and ramps 122A and 124A is applicable to the remaining pawls 108, brackets 118, and ramps 122 and 124 of clutch 100. In the discussion above and the discussion that follows, capital letters are used to designate a specific component from a group of components otherwise designated by a three digit number, for example, pawl 108A is a specific pawl from among pawls 108.

Figure 7:
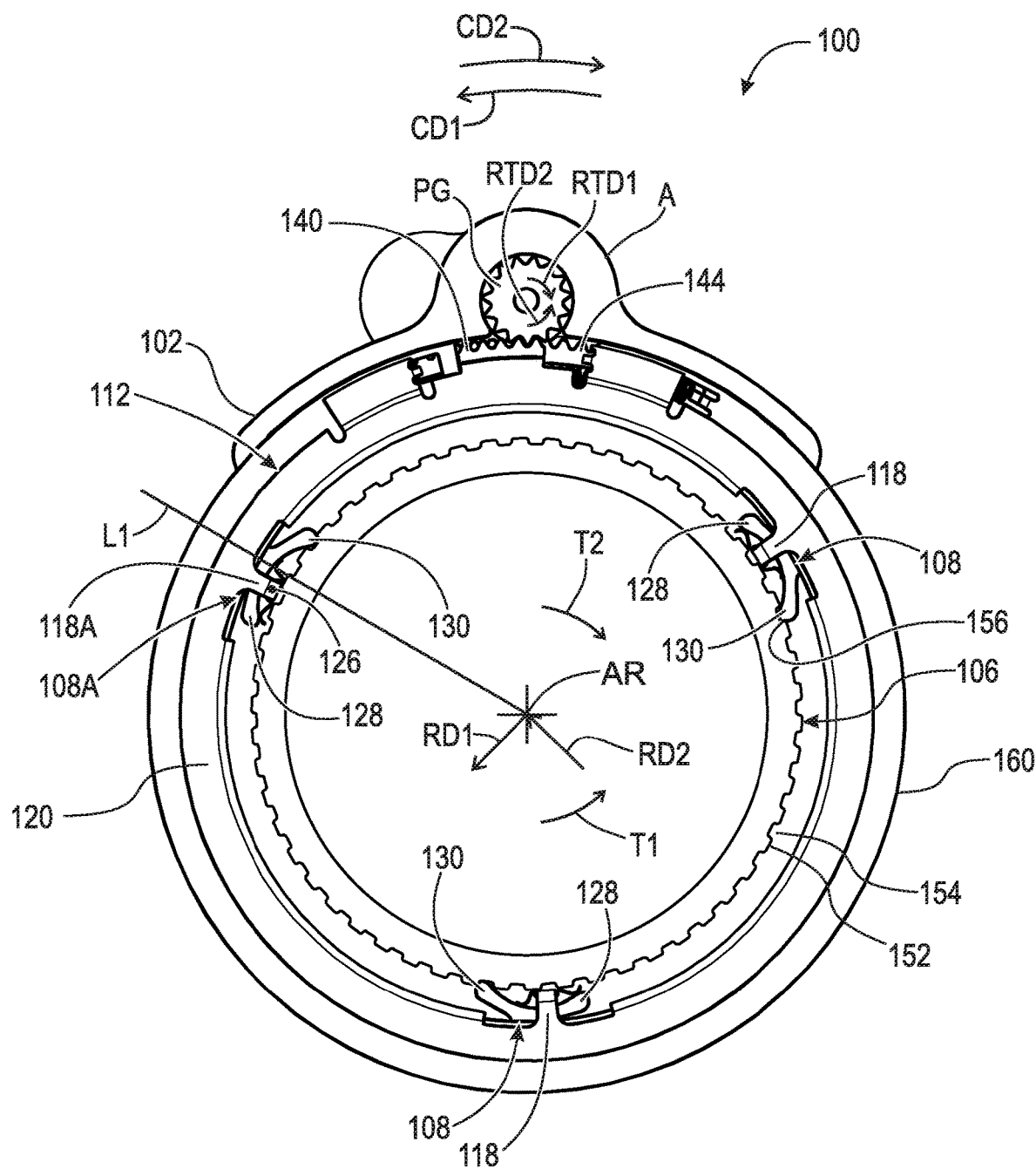
FIG. 7 is a front view of the switchable ratcheting clutch shown in FIG. 1 in a first one-way mode.

FIG. 7 is a front view of switchable clutch 100 shown in FIG. 1 in a first one-way mode.

Figure 8:
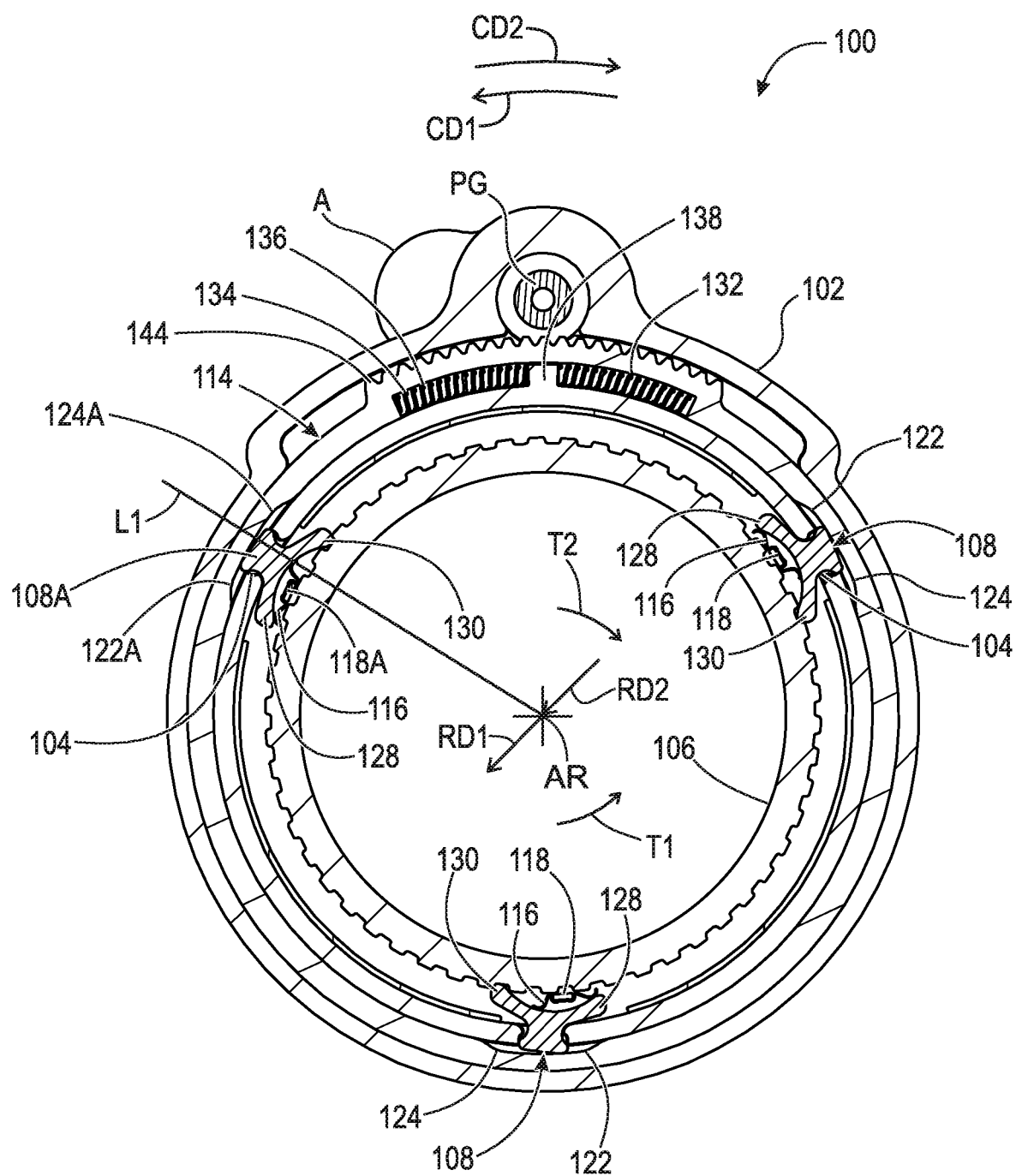
FIG. 8 is a cross-sectional view generally along line 4,8,10,12,13-4,8,10,12,13 in FIG. 3, with the switchable ratcheting clutch in the first one-way mode.

FIG. 8 is a cross-sectional view generally along line 4,8,10,12,13-4,8,10,12,13 in FIG. 3, with switchable clutch 100 in the first one-way mode. The following should be viewed in light of FIGS. 1 through 8. In the first one-way mode: spring ring 112 is in a second circumferential position with respect to housing 102 and pawls 108; and, resilient elements 116 hold pawls 108 in contact with race 106. In the first one-way mode, pawls 108: block rotation of race 106, with respect to housing 102 and pawls 108, in direction CD1; and enable rotation (ratcheting) of race 106, with respect to housing 102 and pawls 108, in direction CD2. In the second circumferential position of ring 112, ring 112, brackets 118 and center points 126 are shifted in direction CD1 with respect to stationary line L1. In the first one-way mode, ring 114 remains in the first circumferential position of ring 114.

In an example embodiment, each pawl 108 includes: protrusion 128 extending in circumferential direction CD1, and protrusion 130 extending in circumferential direction CD2. In an example embodiment, protrusion 128 and protrusion 130 form respective portions of each pawl 108 extending furthest in directions CD1 and CD2, respectively. In the first one-way mode: protrusions 130 are in contact with race 106; protrusions 130 block rotation of race 106, with respect to housing 102, in circumferential direction CD1; and for torque T2, protrusions 130 slide or ratchet along race 106, enabling rotation of race 106, with respect to housing 102, in circumferential direction CD2.

Figure 9:
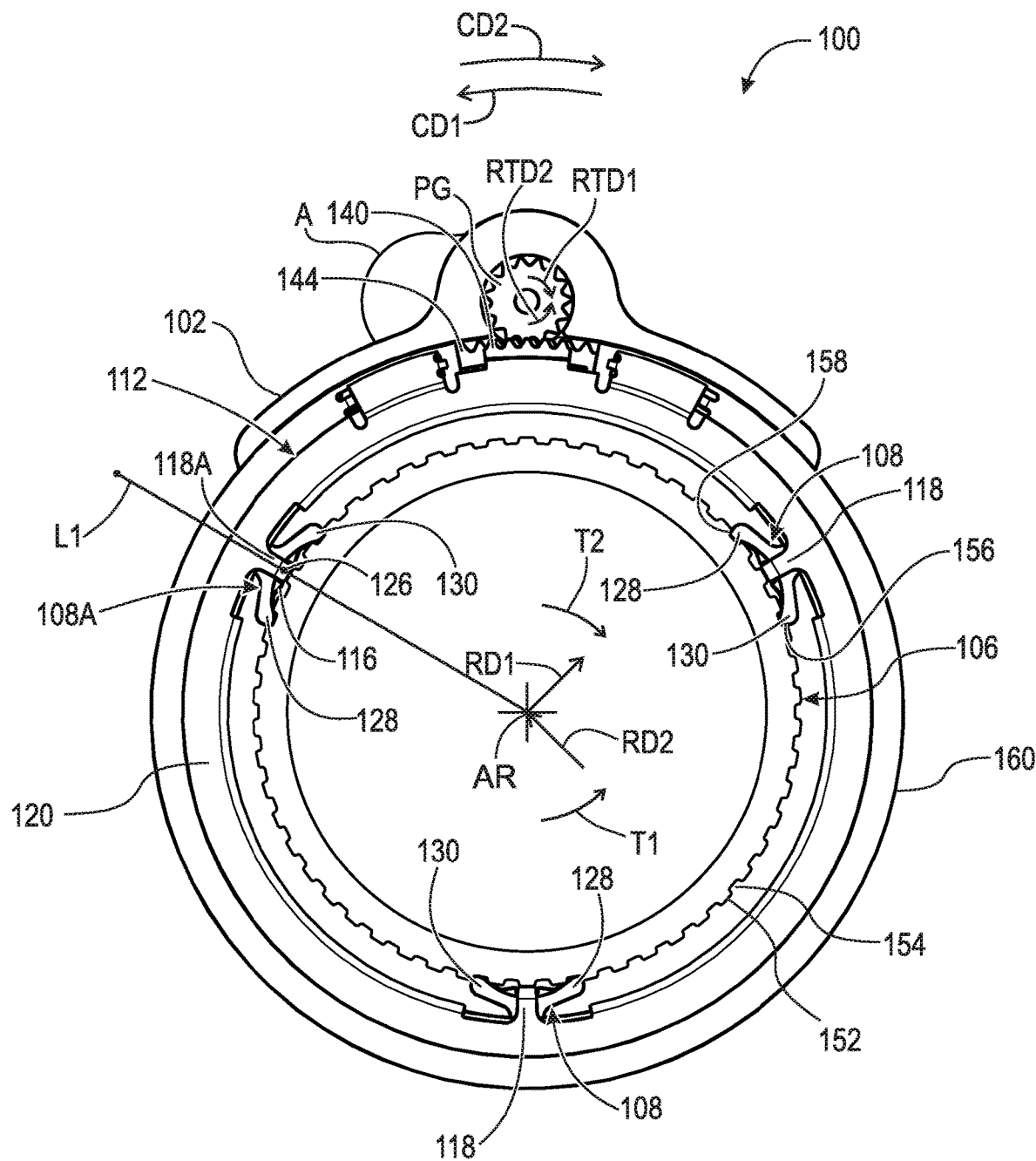
FIG. 9 is a front view of the switchable ratcheting clutch shown in FIG. 1 in a first aspect of a locked mode.

FIG. 9 is a front view of switchable clutch 100 shown in FIG. 1 in a first aspect of a locked mode.

Figure 10:
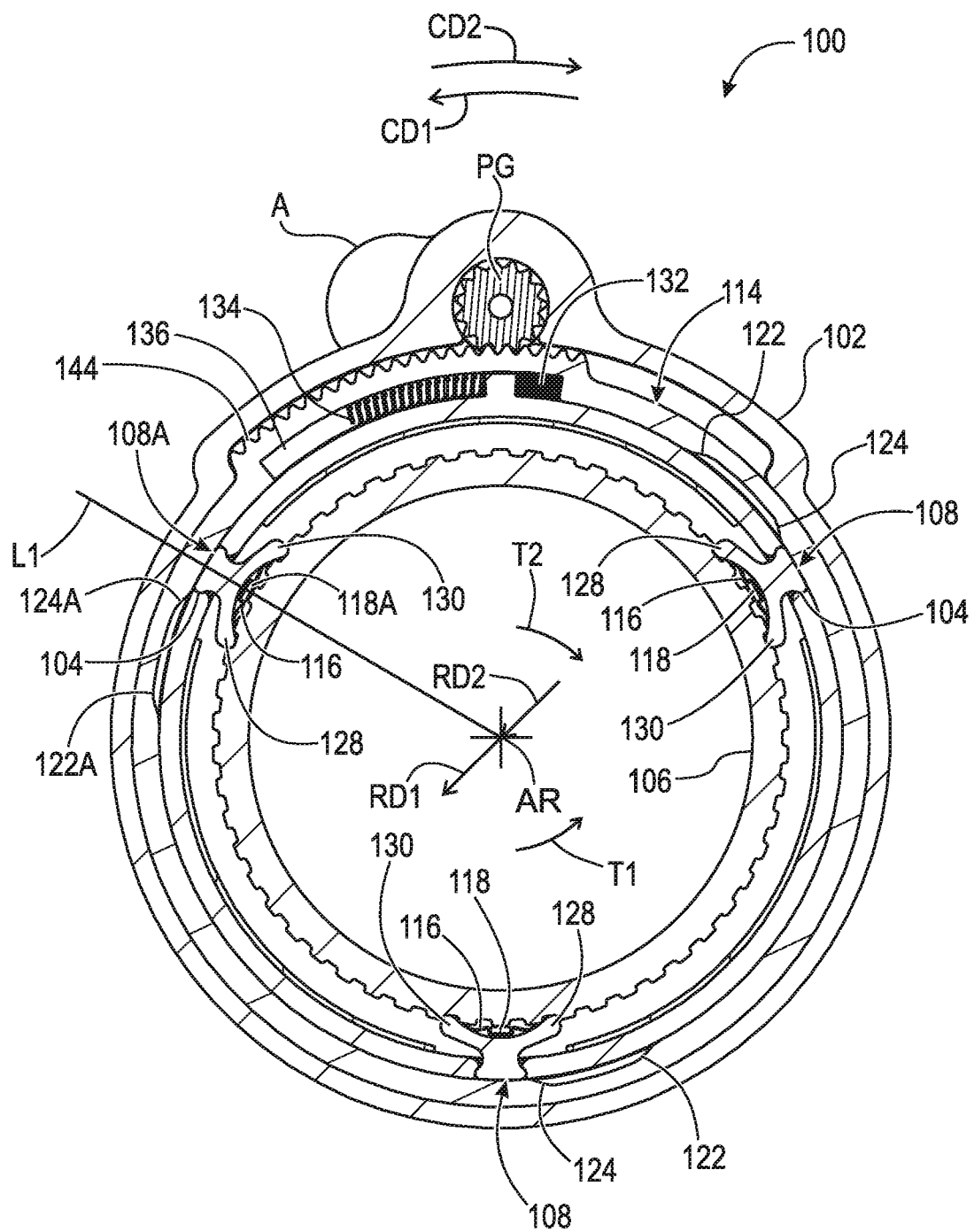
FIG. 10 is a cross-sectional view generally along line 4,8,10,12,13-4,8,10,12,13 in FIG. 3, with the switchable ratcheting clutch in the first aspect of the locked mode.

FIG. 10 is a cross-sectional view generally along line 4,8,10,12,13-4,8,10,12,13 in FIG. 3, with switchable clutch 100 in the first aspect of the locked mode. The following should be viewed in light of FIGS. 1 through 10. In the first aspect of the locked mode of switchable clutch 100: pawls 108 are non-rotatably connected to race 106 to non-rotatably connect race 106 and housing 102 for torque T1 and T2. In the first aspect of the locked mode: ring 112 is in the first circumferential position of ring 112; ring 114 is in a second circumferential position with respect to housing 102 and pawls 108; and ring 114, in particular ramps 124, is in contact with pawls 108. Ring 114 and ramps 124 push at least respective portions, for example respective entireties, of pawls 108 radially inwardly, in radial direction RD2, into contact with race 106, and against the urging of resilient elements 116 in direction RD1. For example, protrusions 128 and 130 are each pushed into non-rotatable contact with race 106.

By "non-rotatably connected" components, we mean that components are connected so that whenever one of the components rotates, all the components rotate; and relative rotation between the components is precluded. Radial and/or axial movement of non-rotatably connected components with respect to each other is possible. Components connected by tabs, gears, teeth, or splines are considered as non-rotatably connected despite possible lash inherent in the connection. The input and output elements of a closed clutch are considered non-rotatably connected despite possible slip in the clutch. The input and output parts of a vibration damper, engaged/in contact with springs for the vibration damper, are not considered non-rotatably connected, due to the compression and unwinding of the springs.

Figure 11:
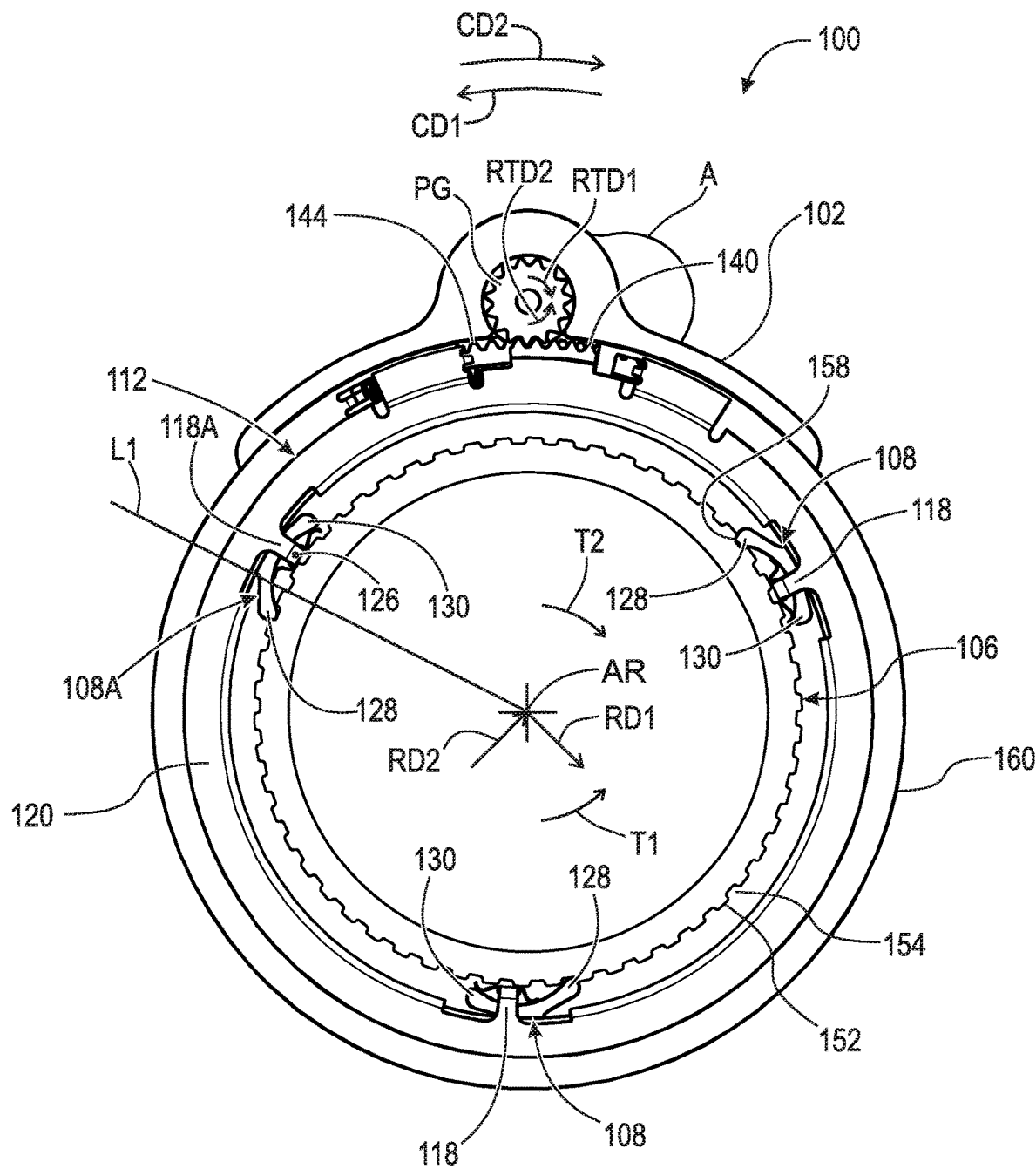
FIG. 11 is a front view of the switchable ratcheting clutch shown in FIG. 1 in a second one-way mode.

FIG. 11 is a front view of switchable clutch 100 shown in FIG. 1 in a second one-way mode.

Figure 12:
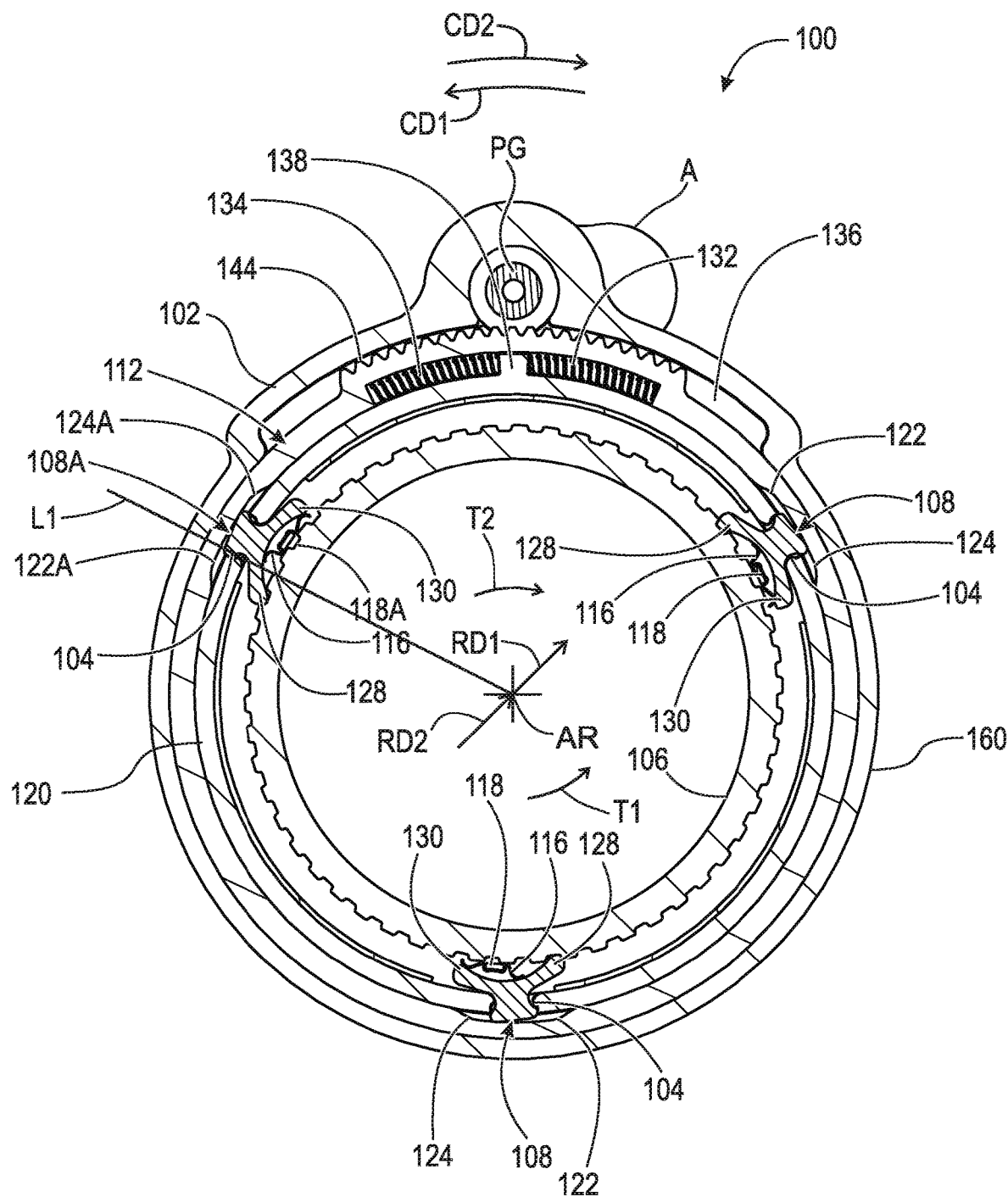
FIG. 12 is a cross-sectional view generally along line 4,8,10,12,13-4,8,10,12,13 in FIG. 3, with the switchable ratcheting clutch in the second one-way mode.

FIG. 12 is a cross-sectional view generally along line 4,8,10,12,13-4,8,10,12,13 in FIG. 3, with switchable clutch 100 in the second one-way mode. The following should be viewed in light of FIGS. 1 through 12. In the second one-way mode: spring ring 112 is in a third circumferential position with respect to housing 102 and pawls 108; and, resilient elements 116 hold pawls 108 in contact with race 106. Pawls 108: block rotation of race 106, with respect to housing 102 and pawls 108, in direction CD2; and enable rotation, ratcheting, of race 106, with respect to housing 102 and pawls 108, in direction CD1. In the third circumferential position of ring 112, center point 126 is shifted in direction CD2 with respect to stationary line L1. In the second one-way mode, ring 114 remains in the first circumferential position of ring 114.

For example, in the second one-way mode: protrusions 128 are in contact with race 106; protrusions 128 block rotation of race 106, with respect to housing 102, in circumferential direction CD2; and for torque T1, protrusions 128 slide or ratchet along race 106, enabling rotation of race 106, with respect to housing 102, in circumferential direction CD1.

In an example embodiment, clutch 100 includes resilient element 132 and resilient element 134 disposed in slot 136 defined by ring 114. Radially outwardly extending protrusion 138 of housing 102 is circumferentially located between resilient element 132 and resilient element 134 in slot 136. For the first circumferential position of ring 114: element 132 reacts against fixed protrusion 138 to urge ring 114 in direction CD2; element 134 reacts against fixed protrusion 138 to urge ring 114 in direction CD1; and the respective spring forces from elements 132 and 134 equilibrate to hold ring 114 in the first circumferential position without the use of an actuator.

Figure 13:
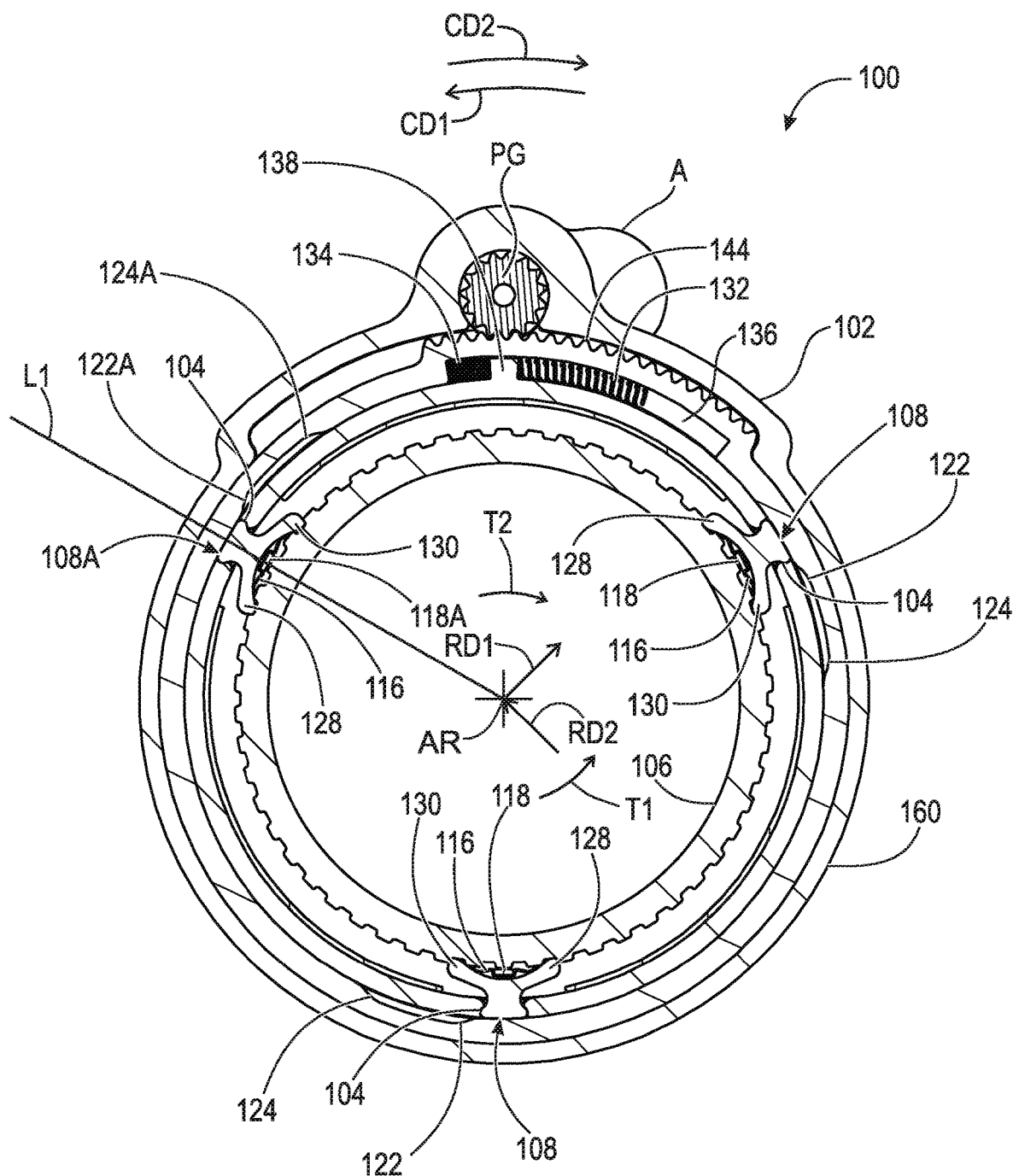
FIG. 13 is a cross-sectional view generally along line 4,8,10,12,13-4,8,10,12,13 in FIG. 3, with the switchable ratcheting clutch in a second aspect of the locked mode; and, FIG. 14 has two views 14A and 14B and is a schematic block diagram of the switchable clutch shown in FIG. 1 with two actuator configurations.

FIG. 13 is a cross-sectional view generally along line 4,8,10,12,13-4,8,10,12,13 in FIG. 3, with switchable clutch 100 in a second aspect of the locked mode. The following should be viewed in light of FIGS. 1 through 13. In the second aspect of the locked mode of switchable clutch 100: pawls 108 are non-rotatably connected to race 106 to non-rotatably connect race 106 and housing 102 for torque T1 and T2. In the second aspect of the locked mode: ring 112 is in the first circumferential position of ring 112; ring 114 is in a third circumferential position with respect to housing 102 and pawls 108; and ring 114, in particular ramps 122, is in contact with pawls 108. The third circumferential position of ring 114 is shifted in direction CD2 with respect to the first circumferential position of ring 114. Ring 114 and ramps 122 push at least respective portions, for example respective entireties, of pawls 108 radially inwardly, in radial direction RD2, into contact with race 106, and against the urging of resilient elements 116 in direction RD1. For example, protrusions 128 and 130 are each pushed into non-rotatable contact with race 106.

The following provides further detail regarding example structure and operation of clutch 100. Actuator A is used to rotate ring 112 and ring 114 among the various circumferential positions noted above. In the example of FIG. 1, actuator A is an electric motor with an axially displaceable pinion gear PG. The following is directed to an example configuration of actuator A.

For the free-wheel, first one-way, and second one-way modes, a solenoid (not visible in the drawings) of actuator A is activated to displace gear PG in direction AD1 to engage ring 112. In the example of FIG. 1, clutch 100 includes toothing 140, fixedly connected to ring 112, and extending radially outwardly from circumferentially continuous annular portion 120 of ring 112. Actuator A displaces gear PG in direction AD1 to mesh with toothing 140. In an example embodiment (not shown), toothing 140 is integral to ring 112.

To transition from the free-wheel mode to the first one-way mode, actuator A rotates gear PG in direction RTD1 to rotate ring 112 in direction CD1. To transition from the free-wheel mode to the second one-way mode, actuator A rotates gear PG in direction RTD2 to rotate ring 112 in direction CD2. To transition from the first one-way mode to the free-wheel mode or the second one-way mode, actuator A rotates gear PG in direction RTD2 to rotate ring 112 in direction CD2. To transition from the second one-way mode to the free-wheel mode or the first one-way mode, actuator A rotates gear PG in direction RTD1 to rotate ring 112 in direction CD1.

In the example of FIG. 1, for the free-wheel, first one-way mode, and second one-way mode, actuator A is disengaged from ring 114 and resilient elements 132 and 134 hold ring 114 in the first circumferential position of ring 114. Thus, ring 114 is free of contact with pawls 108 for the free-wheel, first one-way, and second one-way modes.

In an example embodiment, ring 114 includes teeth 144. In the example of FIG. 1, for the locked mode, the solenoid (not shown) of actuator A is de-energized so that gear PG retracts in direction AD2, opposite direction AD1, to disengage from ring 112 and mesh with teeth 144 of ring 114. Prior to de-energizing the solenoid: actuator A displaces ring 112 to the first circumferential position (the free-wheel mode position) of ring 112; or extracting gear PG from ring 112 enables ring 112 to circumferentially displace, in response to the operation of ring 114 described below, to the first circumferential position of ring 112.

To transition to the first aspect of the locked mode, with ring 114 in the first circumferential position, actuator A is arranged to pivot gear PG in direction RTD1 to: displace ring 114 in direction CD1; compress resilient element 132 against protrusion 138; and slide pawls 108 along radially inwardly sloping ramps 124 to displace at least respective portions of pawls 108 radially inwardly into non-rotatable contact with race 106.

To transition to the second aspect of the locked mode, with ring 114 in the first circumferential position, actuator A is arranged to pivot gear PG in direction RTD2 to: displace ring 114 in direction CD2; compress resilient element 134 against protrusion 138; and slide pawls 108 along radially inwardly sloping ramps 122 to displace at least respective portions of pawls 108 radially inwardly into non-rotatable contact with race 106.

Each resilient element 116 includes: distal end 146 in contact with distal end 128 of a respective pawl 108; and distal end 148 in contact with distal end 130 of a respective pawl 108. Distal ends 146 and 148 urge protrusions 128 and 130, respectively, radially outwardly with forces F1 and F2, respectively. To transition from the locked mode, the free-wheel mode or the second one-way mode to the first one-way mode: actuator A is arranged to slide elements 116 along radially inwardly facing surfaces 150 of pawls 108 in direction CD1, increasing force F1, while decreasing force F2; and ends 146 tip protrusions 130 into contact with race 106. In an example embodiment, race 106 includes radially outwardly extending teeth 152 and teeth 152 define slots 154. In the first one-way mode, protrusions 130 displace into respective slots 154 and contact respective walls 156 of teeth 152 to prevent rotation of race 106, with respect to housing 102, in direction CD1.

To transition from the locked mode, the free-wheel mode or the first one-way mode to the second one-way mode: actuator A is arranged to slide elements 116 along radially inwardly facing surfaces 150 of pawls 108 in direction CD2, increasing force F2, while decreasing force F1; and ends 148 tip protrusions 128 into contact with race 106. In the second one-way mode, protrusions 128 displace into respective slots 154 and contact respective walls 158 of teeth 152 to prevent rotation of race 106, with respect to housing 102, in direction CD2.

To transition to the locked mode from the free-wheel mode, the first one-way mode, or the second one-way mode, actuator A is arranged to slide elements 116 along radially inwardly facing surfaces 150 of pawls 108 in direction CD1 or CD2 to place ring 112 in the first circumferential position of ring 112 and substantially equalize force F1 and force F2.

In the locked mode, for each pawl 108: end 128 and end 130 are disposed in respective slots 154; and contact of end 128 and end 130 with wall 158 and 156 of the respective slots 154 prevents rotation of race 106 with respect to pawls 108 and housing 102. In an example embodiment, clutch 100 includes plate 160 axially disposed between ring 112 and ring 114 and in contact with ring 112 and ring 114.

Figure 14A:
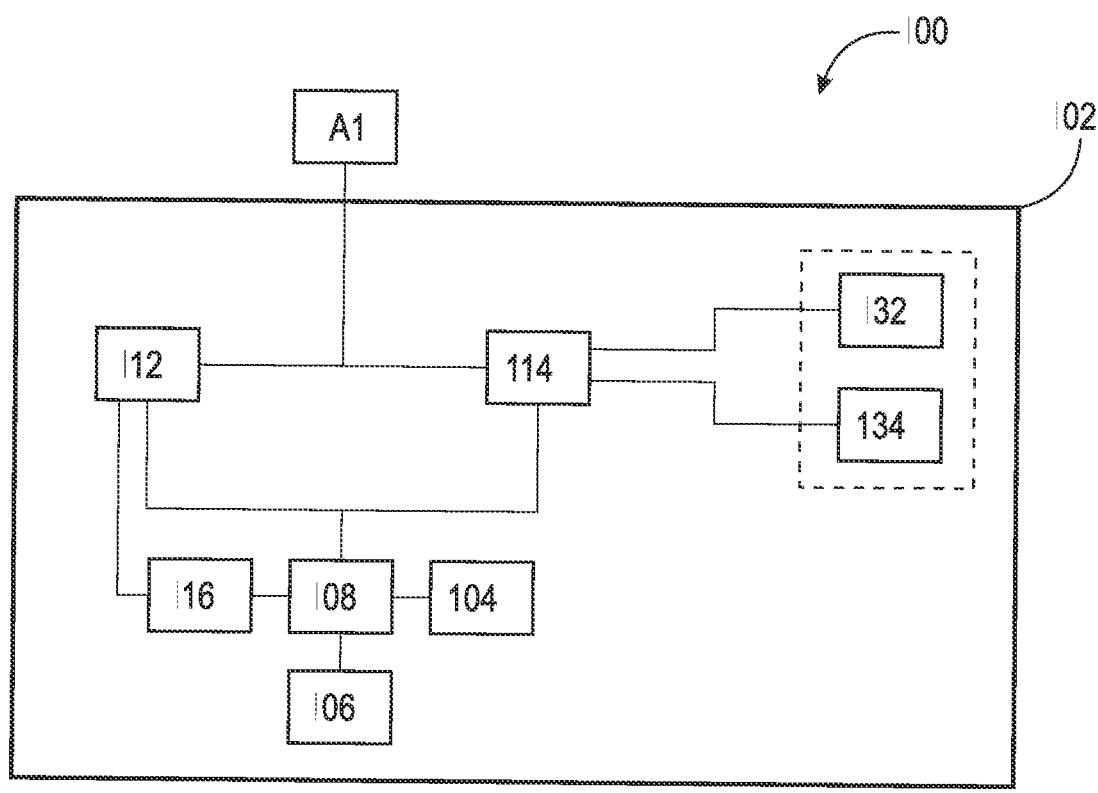
Figure 14B:
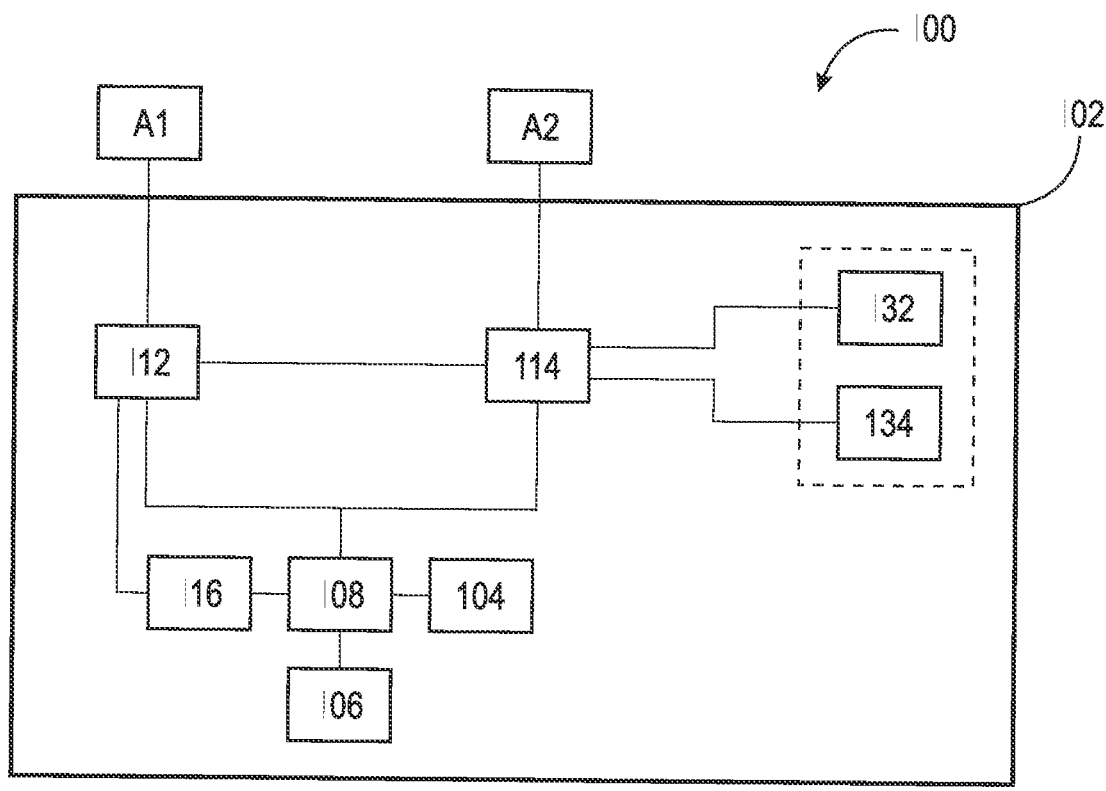

FIG. 14 is a schematic block diagram of switchable clutch 100 with two actuator configurations. Unless stated otherwise, the structure and operation of clutch 100 depicted in FIG. 14 is the same as the structure and operation of clutch 100 depicted in FIGS. 1 through 13. FIG. 14 depicts two example configurations of actuators. The first configuration uses actuator A as described in the discussion for FIGS. 1 through 13. The second configuration uses separate actuators ACT1 and ACT2 to rotate ring 112 and ring 114, respectively. Both configurations are shown in FIG. 14 with the understanding that the configurations are alternatives and are not meant to be implemented concurrently. Actuators ACT1 and ACT2 can be part of clutch 100 or can be separate from clutch 100.

Actuator ACT1 performs the operations on ring 112 described for actuator A in the discussion for FIGS. 1 through 13. For example, actuator ACT1 engages with ring 112 and rotates ring 112 among the respective circumferential positions of ring 112 associated with the locked mode, the free-wheel mode, the first one-way mode, and the second one-way mode of clutch 100. Actuator ACT2 performs the operations on ring 114 described for actuator A in the discussion for FIGS. 1 through 13. For example, actuator ACT2 rotates ring 114 among the respective circumferential positions of ring 114 associated with the locked mode, the free-wheel mode, the first one-way mode, and the second one-way mode of clutch 100. In an example embodiment, actuators ACT1 and ACT2 engage structure similar to toothing 140 and teeth 144, respectively.

For the example configuration with actuators ACT1 and ACT2, actuators ACT1 and ACT2 can remain engaged with ring 112 and ring 114, respectively, for all the operating modes of clutch 100, since actuators ACT1 and ACT2 rotate ring 112 and ring 114, respectively, independent of each other. Since actuators ACT1 and ACT2 rotate ring 112 and ring 114, respectively, independent of each other, resilient elements 132 and 134 are not necessary to position ring 114 for the free-wheel mode, the first one-way mode, and the second one-way mode, and in an example embodiment, are not included in clutch 100.

The following should be viewed in light of FIGS. 1 through 14 and describes a method of operating switchable clutch 100. Although the method is presented as a sequence of steps for clarity, no order should be inferred from the sequence unless explicitly stated. A first step, urges, with a resilient element 116, a pawl 108 radially outwardly and out of contact with race 106 for a free-wheel mode of switchable clutch 100. A second step enables rotation of race 106, with respect to housing 102, in circumferential direction CD1 and in circumferential direction CD2. A third step rotates spring ring 112, with actuator A or actuator A1 and with respect to housing 102, in circumferential direction CD1. A fourth step tips, with resilient element 116, distal end 130 of the pawl 108 into contact with race 106. A fifth step, for a first one-way mode of switchable clutch 100: blocks, with the pawl 108, rotation of race 106, with respect to housing 102, only in circumferential direction CD1; and enables rotation of race 106, with respect to housing 102, only in circumferential direction CD2.

A sixth step rotates spring ring 112, with actuator A or actuator A1 and with respect to housing 102, in circumferential direction CD2. A seventh step tips, with the resilient element 116, distal end 128 of the pawl 108 into contact with race 106. An eighth step, for a second one-way mode of switchable clutch 100: blocks, with the pawl 108, rotation of race 106, with respect to housing 102, only in circumferential direction CD2; and enables rotation of race 106, with respect to housing 102, only in circumferential direction CD1.

To transition to a locked mode of switchable clutch 100 from the free-wheel mode, the first one-way mode, or the second one-way mode, a ninth step: rotates, with respect to housing 102 and with actuator A or with actuator A2, ramp ring 114 in circumferential direction CD1 or in circumferential direction CD2; displaces, with ramp ring 114, the pawl 108 radially inwardly against the urging of the resilient element 116; and non-rotatably connects housing 102, the pawl 108, and race 106.

The ramp ring includes: ramp 122 sloping radially inwardly in direction CD1; and ramp 124 sloping radially inwardly in direction CD2. In an example embodiment, rotating, with respect to housing 102 and with actuator A or with actuator A2, ramp ring 114 in circumferential direction CD1 or in circumferential direction CD2 includes sliding ramp 124 along the pawl 108 or sliding ramp 122 along the pawl 108, respectively.

A tenth step, from the locked mode: urges, with resilient element 132 or resilient element 134, ramp ring 114 out of contact with ramp 122 or with ramp 124; displaces, with actuator A or actuator A1 and with respect to housing 102, spring ring 112; and transitions to the free-wheel mode, the first one-way mode, or the second one-way mode.

Switchable ratcheting clutch 100 provides a four-mode clutch solution (the first one-way mode, the second one-way mode, the free-wheel mode, and the locked mode), using the same sets of pawls 108 and resilient elements 116 for each mode. Thus, the same pairs of pawls 108 and resilient elements 116 replace the known use of separate sets of components, for example sets of pawls and ancillary components, for each mode of a ratcheting clutch. As a result, clutch 100 reduces the parts count, complexity, weight, and production costs associated with dual one-way mode functionality. In addition, clutch 100 provides a free-wheel mode and a locked mode using the same sets of pawls 108 and resilient elements 116.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

A actuator
ACT1 actuator
ACT2 actuator
AD1 axial direction
AD2 axial direction
AR axis of rotation
CD1 circumferential direction
CD2 circumferential direction
F1 force
F2 force
L1 line
PG pinion gear, actuator
RD1 radially outer direction
RD2 radially inner direction
RTD1 rotational direction, pinion gear
RTD2 rotational direction, pinion gear
100 switchable ratcheting clutch
102 housing
104 pocket
106 race
108 pawl
108A pawl
110 portion, pawl
111 portion, pawl
112 ring
114 ring
116 resilient element
117 portion, ring 112
118 bracket, ring 112
118A bracket, ring 112
120 annular portion, ring 112
122 ramp, ring 114
122A ramp, ring 114
124 ramp, ring 114
124A ramp, ring 114
126 center point bracket
128 distal end, pawl
130 distal end, pawl
132 resilient element
134 resilient element
136 slot, ring 114
138 protrusion, housing
140 toothing, ring 112
144 tooth, ring 114
146 distal end, element 116
148 distal end, element 116
150 radially inward surface, pawl 108
152 tooth, inner race
154 slot, inner race
156 wall, tooth 152
158 wall, tooth 152
160 plate

The invention claimed is:

1. A switchable clutch, comprising:
a housing defining a pocket;
a race arranged to receive rotational torque;
a pawl including a portion disposed in the pocket;
a spring ring located radially outward of the race and rotatable by a first actuator to a first circumferential position with respect to the pawl;
a ramp ring located radially outward of the race; and,
a first resilient element fixedly connected to the spring ring and in contact with the pawl, wherein:
in a free-wheel mode of the switchable clutch:
the race is rotatable, with respect to the housing, in a first circumferential direction and in a second circumferential direction, opposite the first circumferential direction; and, the first resilient element urges the pawl radially outwardly out of contact with the race;
in a first one-way mode of the switchable clutch:
the spring ring is in the first circumferential position with respect to the pawl;
the first resilient element urges the pawl into contact with the race; and,
the pawl blocks rotation of the race, with respect to the housing, only in the first circumferential direction; and,
in a locked mode of the switchable clutch, the ramp ring, the pawl, and the race are non-rotatably connected.

2. The switchable clutch of claim 1, wherein:
the spring ring is rotatable by the first actuator to a second circumferential position with respect to the pawl; and,
in the free-wheel mode, the spring ring is in the second circumferential position.

3. The switchable clutch of claim 1, further comprising:
a second resilient element urging the ramp ring in the first circumferential direction and,
a third resilient element urging the ramp ring in the second circumferential direction, wherein:
the second resilient element and the third resilient element hold the ramp ring in a circumferential position with respect to the housing; and,
in the free-wheel mode and in the first one-way mode, the ramp ring is in the circumferential position with respect to the housing.

4. The switchable clutch of claim 1, wherein:
the spring ring is rotatable by the first actuator to a second circumferential position with respect to the pawl; and,
in a second one-way mode of the switchable clutch:
the spring ring is in the second circumferential position with respect to the pawl;
the first resilient element urges the pawl into contact with the race; and,
the pawl blocks rotation of the race, with respect to the housing, only in the second circumferential direction.

5. The switchable clutch of claim 1, wherein:
the spring ring is rotatable by the first actuator to a second circumferential position with respect to the pawl; and,
in the locked mode and in the free-wheel mode, the spring ring is in the second circumferential position of the spring ring.

6. The switchable clutch of claim 1, wherein:
the ramp ring is rotatable, by the first actuator, to a first circumferential position with respect to the pawl, and in the locked mode, the ramp ring is in the first circumferential position of the ramp ring; or,
the ramp ring is rotatable, by a second actuator, to a first circumferential position with respect to the pawl, and in the locked mode, the ramp ring is in the first circumferential position of the ramp ring.

7. The switchable clutch of claim 6, wherein:
the ramp ring includes:
a first ramp sloping radially inwardly in the first circumferential direction; and,
a second ramp sloping radially inwardly in the second circumferential direction; and,
in the first circumferential position of the ramp ring, the pawl is in contact with the first ramp or with the second ramp.

8. The switchable clutch of claim 6, wherein:
the spring ring is rotatable by the first actuator to a second circumferential position with respect to the pawl;
in a second one-way mode of the switchable clutch:
the spring ring is in the second circumferential position with respect to the pawl;
the first resilient element urges the pawl into contact with the race; and,
the pawl enables rotation of the race, with respect to the housing, only in the first circumferential direction.

9. The switchable clutch of claim 1,
wherein:
the race is supported for rotation about an axis of rotation;
the spring ring includes a bracket extending in an axial direction parallel to the axis of rotation; and,
the first resilient element is fixedly connected to the axially extending bracket; or,
wherein:
the race is supported for rotation about an axis of rotation;
the spring ring includes a bracket extending in an axial direction parallel to the axis of rotation;
the first resilient element is fixedly connected to the bracket; and,
in the free-wheel mode, a straight line, passing through the axis of rotation and the bracket, bisects the pawl in the first circumferential direction; or,
wherein:
the race is supported for rotation about an axis of rotation; and,
a portion of the ramp ring overlaps the spring ring in an axial direction parallel to the axis of rotation; or,
a portion of the ramp ring is off-set from the spring ring in an axial direction parallel to the axis of rotation.

10. The switchable clutch of claim 1, wherein:
the spring ring is rotatable with respect to the housing and the ramp ring; and,
the ramp ring is rotatable with respect to the housing and the spring ring.

11. A switchable clutch, comprising:
a housing;
a race arranged to receive rotational torque and at least a portion of which is enclosed by the housing;
a pawl;
a spring ring located radially outward of the race;
a ramp ring located radially outward of the race; and,
a first resilient element fixedly connected to the spring ring and in contact with the pawl, wherein:
in a free-wheel mode of the switchable clutch:
the race is rotatable, with respect to the housing, in a first circumferential direction and in a second circumferential direction, opposite the first circumferential direction; and,
the pawl is free of contact with the race;
in a first one-way mode of the switchable clutch, the race is rotatable, with respect to the housing, only in the second circumferential direction;
to transition from the free-wheel mode to the first one-way mode, the spring ring is arranged to be rotated, by a first actuator, in the first circumferential direction, and the first resilient element is arranged to displace the pawl into contact with the race;
in a locked mode of the switchable clutch, the race is non-rotatably connected to the pawl; and,
to transition to the locked mode from the free-wheel mode or from the first one-way mode:

the ramp ring is arranged to be rotated, by the first actuator, in the first circumferential direction or in the second circumferential direction, and the ramp ring is arranged non-rotatably connect the pawl and the race; or the ramp ring is arranged to be rotated, by a second actuator, in the first circumferential direction or in the second circumferential direction, and the ramp ring is arranged non-rotatably connect the pawl and the race.

12. The switchable clutch of claim 11, wherein:
the pawl includes a distal end; and,
to transition from the free-wheel mode or the locked mode to the first one-way mode, the spring ring is arranged to slide the first resilient element along the pawl in the first circumferential direction to displace the distal end into contact with the race.

13. The switchable clutch of claim 11, wherein:
to transition from the free-wheel mode or the first one-way mode to the locked mode, the ramp ring is arranged to displace at least a portion of the pawl radially inwardly into contact with the race; or,
to transition from the locked mode to the free-wheel mode or the first one-way mode, the first resilient element is arranged to displace at least a portion of the pawl radially outwardly.

14. The switchable clutch of claim 11, wherein:
the ramp ring includes:
a first ramp sloping radially inwardly in the first circumferential direction; and,
a second ramp sloping radially inwardly in the second circumferential direction; and,
to transition from the free-wheel mode or the first one-way mode to the locked mode:
the first actuator is arranged to slide the first ramp or the second ramp along the pawl; or,
the second actuator is arranged to slide the first ramp or the second ramp along the pawl.

15. The switchable clutch of claim 11, further comprising:
a second resilient element and a third resilient element, wherein to transition from the locked mode to the free-wheel mode or the first one-way mode:
the second resilient element is arranged to displace the ramp ring in the first circumferential direction with respect to the pawl; or,
the third resilient element is arranged to displace the ramp ring in the second circumferential direction with respect to the pawl.

16. The switchable clutch of claim 11, wherein:
in a second one-way mode of the switchable clutch, the race is rotatable, with respect to the housing, only in the first circumferential direction; and,
to transition from the first one-way mode or the free-wheel mode to the second one-way mode, the spring ring is arranged to be rotated, with respect to the housing and by the first actuator, in the second circumferential direction to tip the pawl into contact with the race.

17. The switchable clutch of claim 11, wherein:
the spring ring is rotatable by the first actuator in the first circumferential direction and in the second circumferential direction; and,
the ramp ring is rotatable, by the first actuator or by the second actuator, in the first circumferential direction and in the second circumferential direction.

18. A method of operating a switchable clutch including a housing defining a pocket, a race, a pawl including a portion disposed in the pocket, a spring ring located radially outward of the race, a ramp ring located radially outward of the race, and a first resilient element fixedly connected to the spring ring, the method comprising:
urging, with the first resilient element, the pawl radially outwardly and out of contact with the race for a free-wheel mode of the switchable clutch;
enabling rotation of the race, with respect to the housing, in a first circumferential direction and in a second circumferential direction, opposite the first circumferential direction;
rotating the spring ring, with a first actuator and with respect to the housing, in the first circumferential direction;
tipping, with the first resilient element, a first distal end of the pawl into contact with the race;
blocking, with the pawl and for a first one-way mode of the switchable clutch, rotation of the race, with respect to the housing, only in the first circumferential direction; and,
to transition to a locked mode of the switchable clutch from the free-wheel mode or the first one-way mode:
rotating, with respect to the housing and with the first actuator or with a second actuator, the ramp ring in the first circumferential direction or in the second circumferential direction;
displacing, with the ramp ring, the pawl radially inwardly; and,
non-rotatably connecting the housing, the pawl, and the race.

19. The method of claim 18, further comprising:
while in the first one-way mode, the free-wheel mode, or the locked mode, rotating the spring ring, with the first actuator and with respect to the housing, in the second circumferential direction, tipping, with the first resilient element, a second distal end of the pawl into contact with the race; and,
blocking, with the pawl and for a second one-way mode of the switchable clutch, rotation of the race, with respect to the housing only in the second circumferential direction.

20. The method of claim 18, wherein:
the ramp ring includes a ramp sloping radially inwardly; and,
rotating, with respect to the housing and with the first actuator or with the second actuator, the ramp ring in the first circumferential direction or in the second circumferential direction includes sliding the ramp along the pawl.

* * * * *